United States Patent [19]

Uchida et al.

[11] Patent Number: 5,662,847

[45] Date of Patent: Sep. 2, 1997

[54] METHOD OF PRODUCING PATTERNED SHAPED ARTICLE USING SCRAPER

[75] Inventors: Hiroshi Uchida, Ashikaga; Mituhiro Onuki, Kiryu; Hideo Watanabe, Ashikaga, all of Japan

[73] Assignee: CCA Inc., Tokyo, Japan

[21] Appl. No.: 325,185

[22] PCT Filed: Aug. 24, 1994

[86] PCT No.: PCT/JP94/01397

§ 371 Date: Apr. 24, 1995

§ 102(e) Date: Apr. 24, 1995

[87] PCT Pub. No.: WO95/05946

PCT Pub. Date: Mar. 2, 1995

[30] Foreign Application Priority Data

Aug. 24, 1993 [JP] Japan ................................. 5-229642

[51] Int. Cl.$^6$ ............................................ B29C 67/02
[52] U.S. Cl. ................. 264/101; 264/112; 264/122; 264/138; 264/139; 264/239; 264/241; 264/344
[58] Field of Search ............................ 264/60, 101, 112, 264/113, 115, 119, 122, 138, 139, 239, 241, 344

[56] References Cited

U.S. PATENT DOCUMENTS

| | | | |
|---|---|---|---|
| 1,583,516 | 5/1926 | Anfield | 264/138 X |
| 1,605,197 | 11/1926 | Anfield | 264/138 X |
| 1,657,784 | 1/1928 | Bergstrom | 51/295 |
| 2,042,964 | 6/1936 | Rinehart | 264/122 X |
| 4,244,993 | 1/1981 | Platka, III et al. | 428/15 |
| 4,803,034 | 2/1989 | Moret | 264/504 |
| 5,047,187 | 9/1991 | Banus | 264/71 |
| 5,173,233 | 12/1992 | Kafarowski | 264/113 |
| 5,209,949 | 5/1993 | Osada | 427/198 |
| 5,246,650 | 9/1993 | Clark | 264/87 |
| 5,368,791 | 11/1994 | Uchida et al. | 264/35 |
| 5,376,321 | 12/1994 | Uchida et al. | 264/60 |
| 5,429,676 | 7/1995 | Uchida et al. | 118/310 |
| 5,445,772 | 8/1995 | Uchida et al. | 264/32 |

FOREIGN PATENT DOCUMENTS

| | | |
|---|---|---|
| 0 586 257 | 3/1994 | European Pat. Off. |
| 61-124547 | 6/1986 | Japan |
| 63-78049 | 5/1988 | Japan |
| 14209 | 10/1911 | United Kingdom |
| 2 215 266 | 9/1989 | United Kingdom |

*Primary Examiner*—Donald E. Czaja
*Assistant Examiner*—Sean Vincent
*Attorney, Agent, or Firm*—Oblon, Spivak, McClelland, Maier & Neustadt, P.C.

[57] ABSTRACT

A method of producing shaped articles of artificial stone, ceramics, metal, plastic and the like, each having a fine, attractive pattern on part or all of the surface thereof formed in a pattern course of a prescribed thickness. The shaped article is produced by forming a dry particle course on a base surface, positioning a scraper at a prescribed point on the base surface, moving the scraper in accordance with the pattern to be expressed, and using a different type of particles to fill the cavity thus formed by the scraper, and allowing the particles to set into an integral mass, either as they are or after being overlaid with a backing course.

7 Claims, 15 Drawing Sheets

FIG. 1
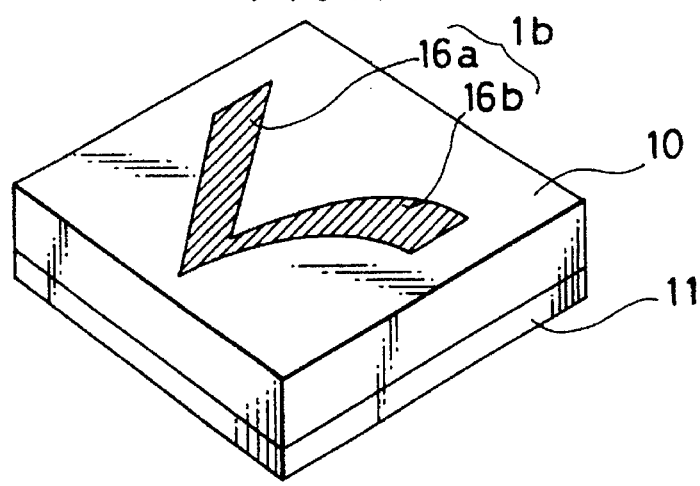
FIG. 2(a)   FIG. 2(b)   FIG. 2(c)
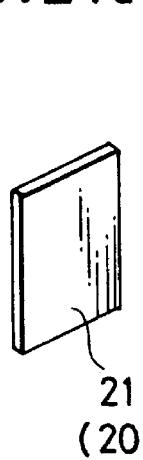 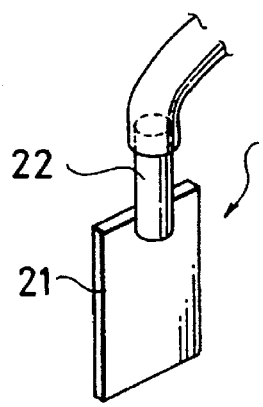 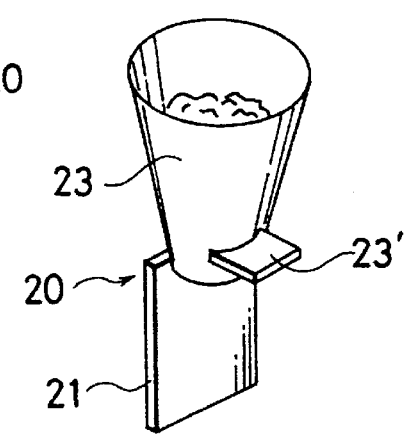
FIG. 3
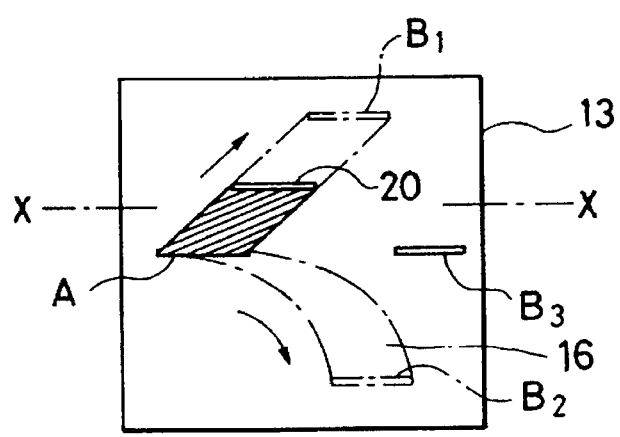

FIG.4(a)  FIG.4(b)
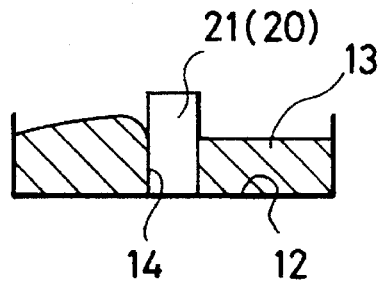
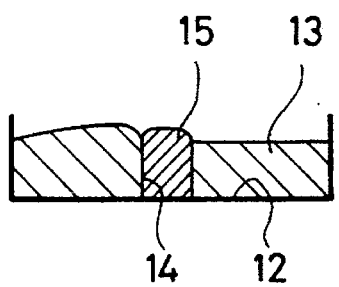
FIG.5
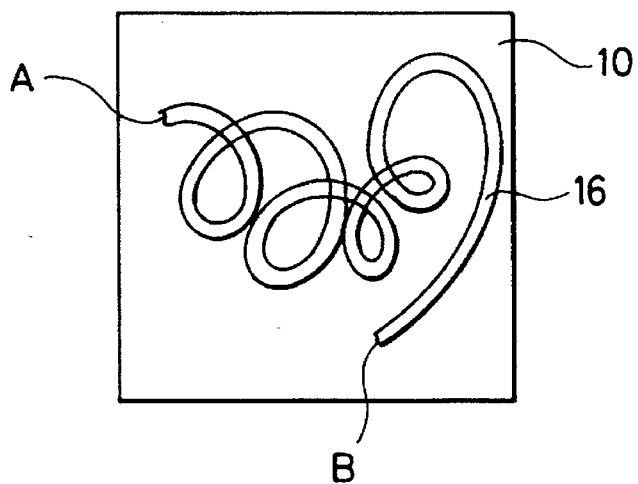
FIG.6(a)  FIG.6(b)
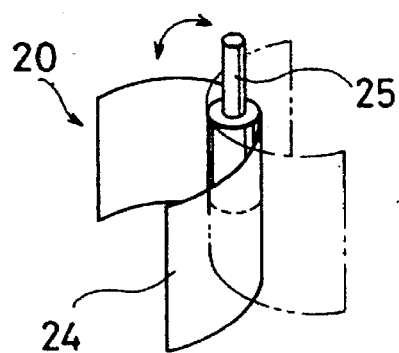
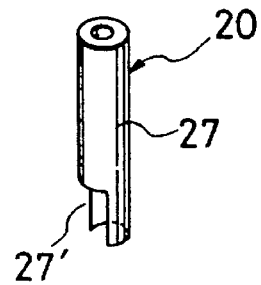

FIG.17
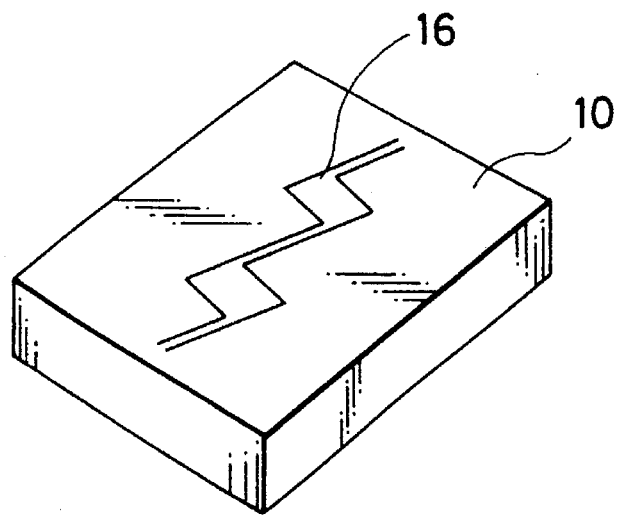
FIG.18(a)    FIG.18(b)
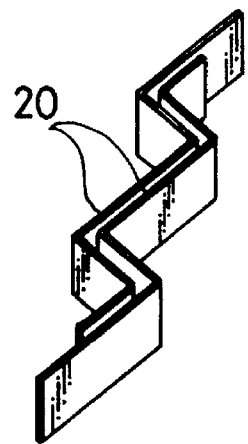    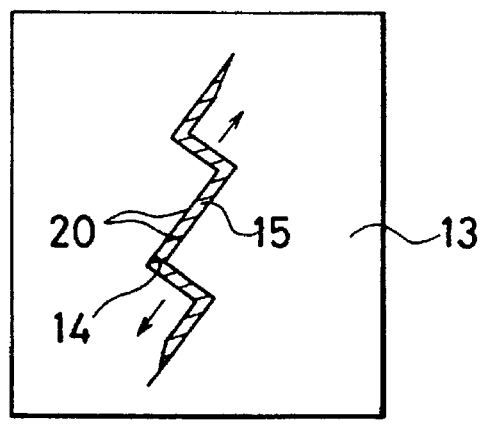

FIG.19(a) FIG.19(b)
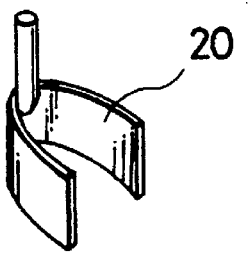
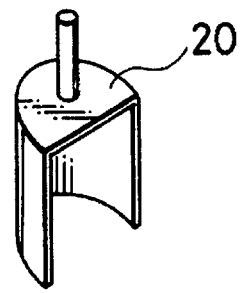
FIG.19(c) FIG.19(d)
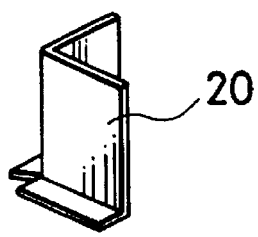
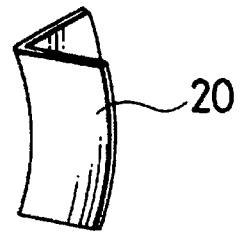
FIG.20
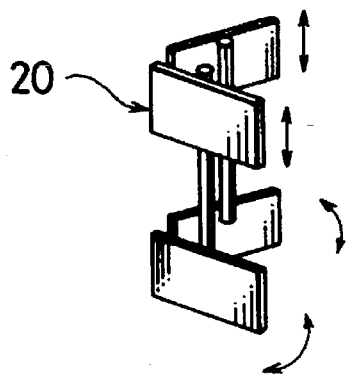

FIG.23(a) FIG.23(b) FIG.23(c) FIG.23(d)
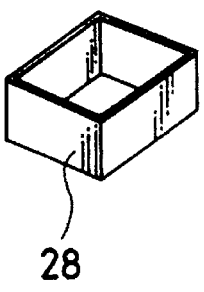
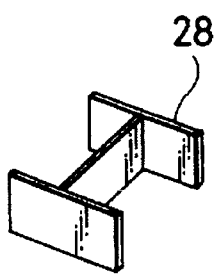
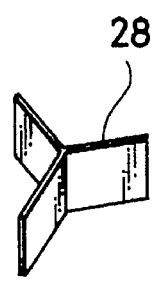
FIG.24
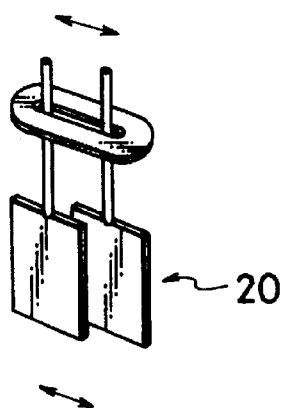

FIG.29
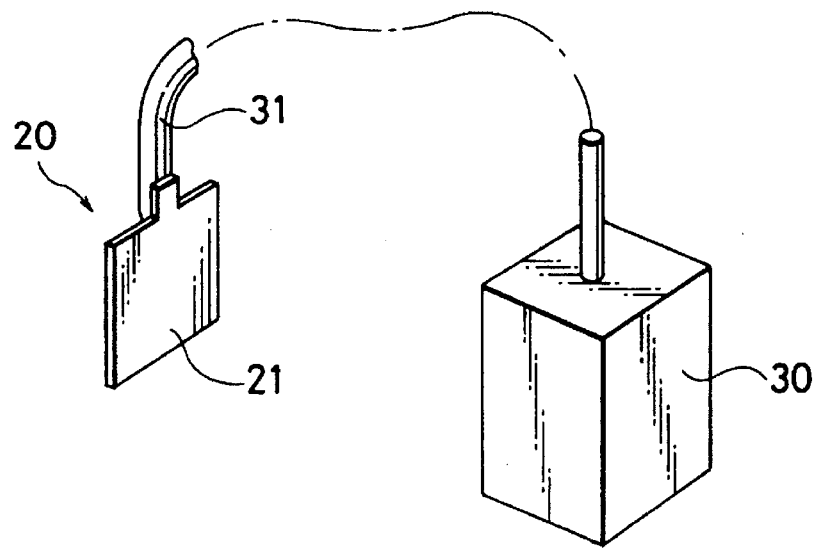
FIG.30(a)     FIG.30(b)
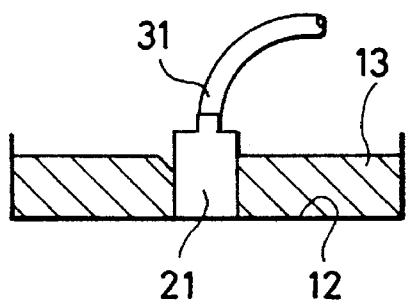 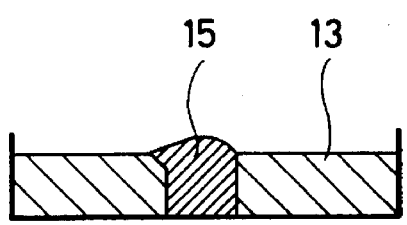
FIG.31
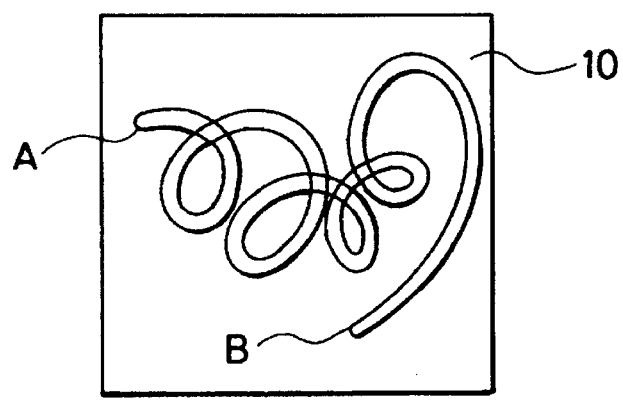

METHOD OF PRODUCING PATTERNED SHAPED ARTICLE USING SCRAPER

TECHNICAL FIELD

This invention relates to a method for producing patterned concrete shaped articles, patterned artificial stone shaped articles, patterned raw products for sintering into ceramic shaped articles, patterned ceramic shaped articles, patterned metal shaped articles, patterned impasto shaped articles, patterned plastic shaped articles, patterned shaped foodstuffs and other such patterned shaped articles, using a scraper.

BACKGROUND ART

Up to now the only way available for providing a part of a surface, such as of paving blocks, with a pattern indicating a pedestrian crossing, a stop sign or other such traffic sign or for providing the entire surface of the blocks with a pattern has been to paint the surface with a coating material such as paint or to inlay the desired pattern.

Since the patterns painted on a part or all of the surface of paving blocks are exposed to abrasion such as from the footwear of pedestrians walking on the blocks, and the tires of vehicles driving over them, they quickly wear off and have to be redone at frequent intervals. The amount of labor involved in this work is considerable. Where the pattern is formed by inlaying, the work itself is troublesome and very costly.

The present inventors previously proposed methods for readily producing various types of patterned shaped articles which do not lose their surface pattern and do not become unsightly even when expose to surface abrasion, using at least one means for folding the material selected from among an auxiliary from corresponding to the pattern to be exposed (in Japanese Patent Laid-Open Application Nos. 4-105903, 5-38707, 5-38708 and 5-238767), a cell body consisting of cylindrical bodies of a set height (in Japanese Patent Laid-Open Application Nos. 4-140104, 4-139083, 5-847157 and 5-84714), and a bristling body (in Japanese Patent Laid-Open Application Nos. 4-345803, 5-324068, 5-327816 and 5-237821).

The object of the present invention is to provide a method of producing shaped articles expressing various patterns such as patterns of lines of various thicknesses.

DISCLOSURE OF THE INVENTION

For achieving the aforesaid object, the present invention provides a method of producing a patterned shaped article comprising the steps of forming a dry particle course on a base surface, moving a scraper located at a prescribed position above the base surface in accordance with a pattern to be expressed, charging a cavity thus formed with a different type of dry particles, and allowing the particles to set into an integral mass, either as they are or after being overlaid with a backing course.

The present invention also provides a method of producing a patterned shaped article comprising the steps of forming a dry particle course on a base surface, moving a scraper located at a prescribed position above the base surface in accordance with a pattern to be expressed while at the same time removing particles by suction, charging a cavity thus formed with a different type of dry particles, and setting the particles into an integral mass, either as they are or after being overlaid with a backing course.

Thus, as in accordance with the method of this invention a dry particle course formed on a base surface is raked and the cavity thus formed is filled with a different type of dry particles, line patterns of a desired thickness can be formed by using a suitably shaped scraper.

The above and other features of the present invention will become apparent from the following description made with reference to the drawings.

BRIEF DESCRIPTION OF THE DRAWINGS

FIG. 1 is a perspective view showing a first example of a shaped article produced according to the invention.

FIGS. 2(a), 2(b) and 2(c) show perspective views of three examples of scrapers used in the method of this invention.

FIG. 3 illustrates how the scraper is moved to form the shaped article of FIG. 1.

FIGS. 4(a) and (b) are sectional views along line X—X of FIG. 3 illustrating cavity formation and filling with different particles.

FIG. 5 is a plan view of a second shaped article formed by the method of the invention.

FIGS. 6(a) and (b) are perspective views of two examples of scrapers used in the method of this invention.

FIG. 17 is a perspective view of a seventh shaped article formed by the method of the invention.

FIGS. 18(a) and (b) show a perspective view of the scraper used to form the shaped article of FIG. 17, and a view illustrating how the scraper was moved to form the article.

FIGS. 19(a), 19(b), 19(c) and 19(d) show perspective views of four scrapers used in the method of this invention.

FIG. 20 is a perspective view of a scraper used in the method of this invention.

FIGS. 23(a), 23(b), 23(c) and 23(d) are perspective views of four end stops used in the method of this invention.

FIG. 24 is a perspective view of a scraper used in the method of this invention.

FIG. 29 is a perspective view of a scraper with a suction port, used in the method of this invention.

FIGS. 30(a) and (b) are a sectional view of a cavity formed using the scraper shown in FIG. 29, and a sectional view showing the cavity filled with a different type of particles.

FIG. 31 is a perspective view of an eighth shaped article formed by the method of the invention.

BEST MODE OF CARRYING OUT THE INVENTION

Figure 7A:
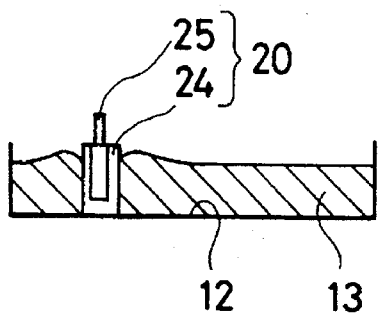
FIGS. 7(a) and (b) are sectional views of a cavity formed by the scraper of FIG. 6(a), and the cavity filled using different particles.
Figure 7B:
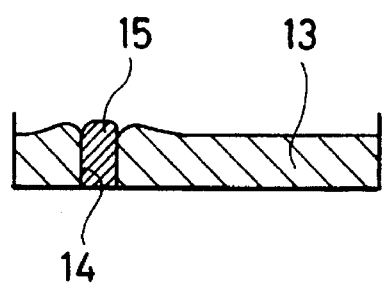
Figure 8:
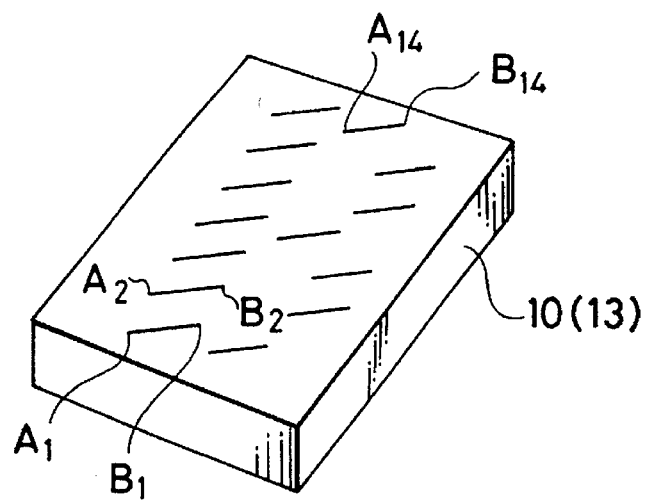
FIG. 8 is a perspective view of a third shaped article formed by the method of the invention.
Figure 9A:
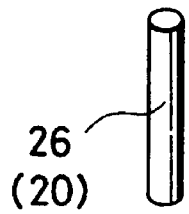
FIGS. 9(a) and (b) are perspective views of two examples of scrapers used in the method of this invention.
Figure 9B:
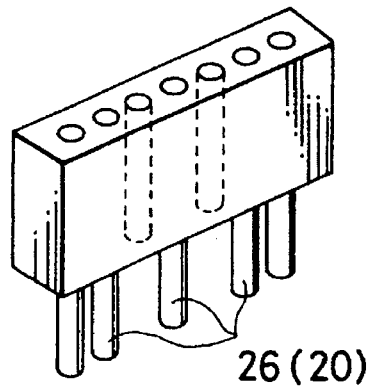
Figure 10:
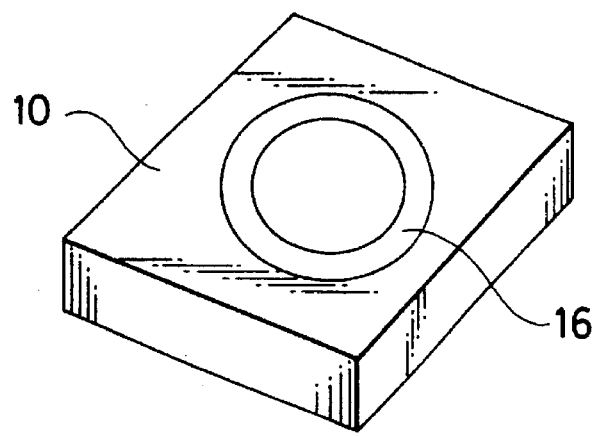
FIG. 10 is a perspective view of a fourth shaped article formed by the method of the invention.
Figure 11:
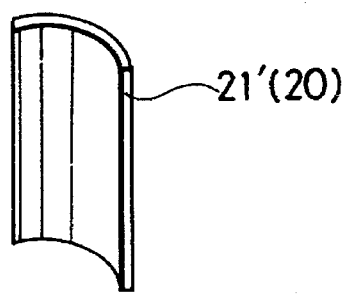
FIG. 11 is a perspective view of a scraper used in the method of this invention.
Figure 14:
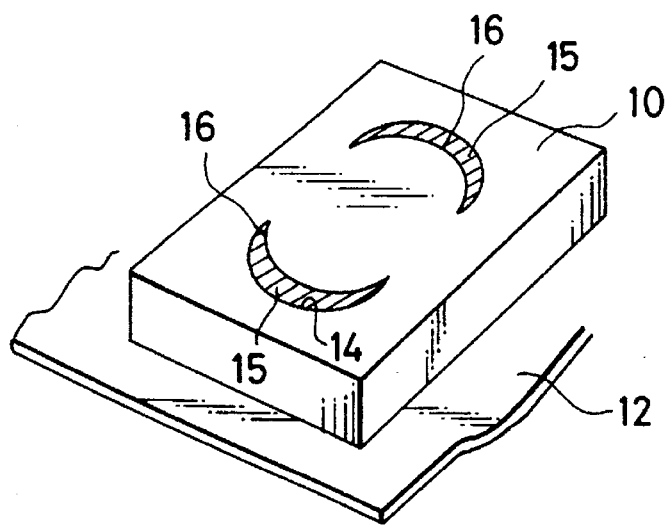
FIG. 14 is a perspective view of a fifth shaped article formed by the method of the invention.
Figure 15:
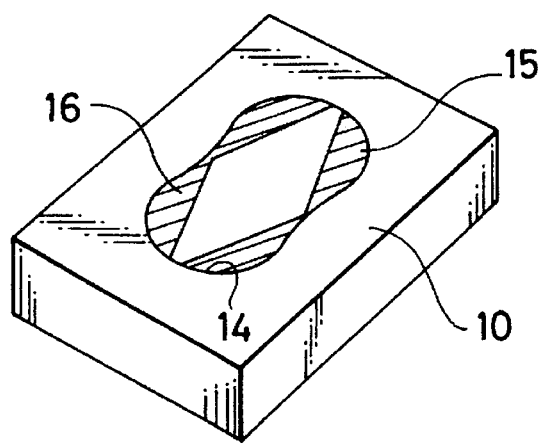
FIG. 15 is a perspective view of a sixth shaped article formed by the method of the invention.
Figure 16:
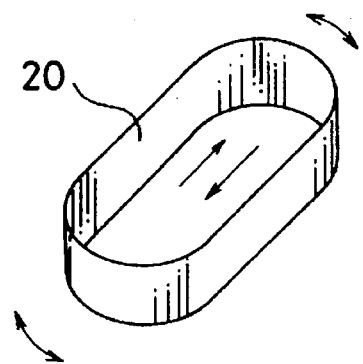
FIG. 16 is a perspective view of the scraper used to form the shaped articles of FIGS. 14 and 15.
Figure 21A:
FIGS. 21(a), 21(b), 21(c) and 21(d) illustrate the operation of four examples of scrapers used in the method of this invention.
Figure 21B:
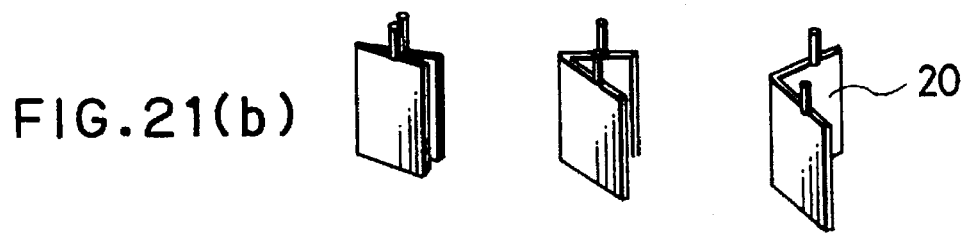
Figure 21C:
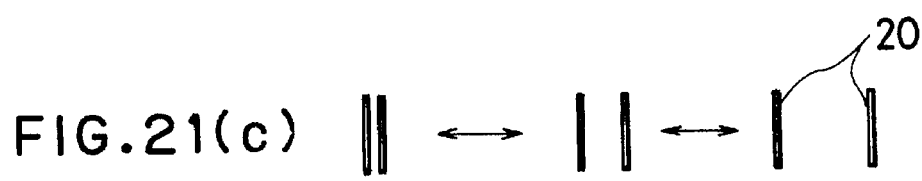
Figure 21D:
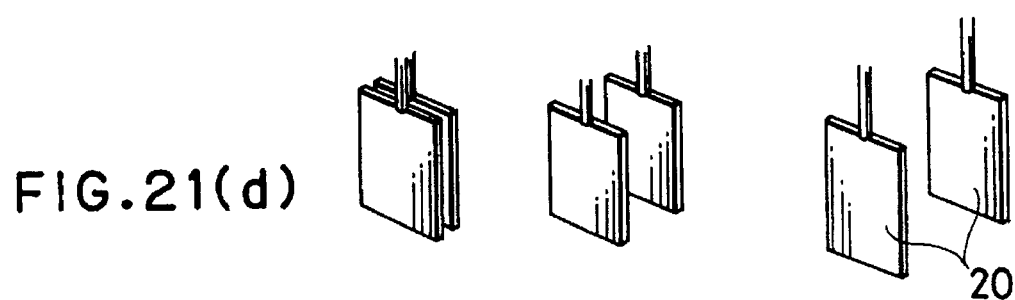
Figure 22A:
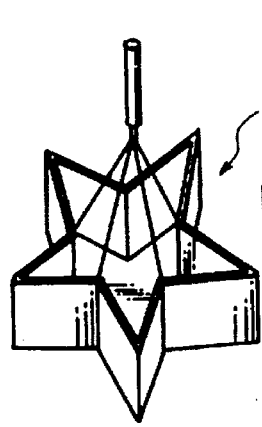
FIGS. 22(a), 22(b) and 22(c) are perspective views of three scrapers used in the method of this invention.
Figure 22B:
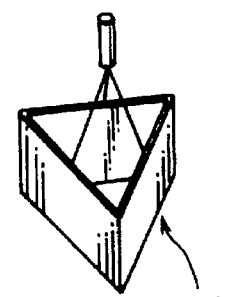
Figure 22C:
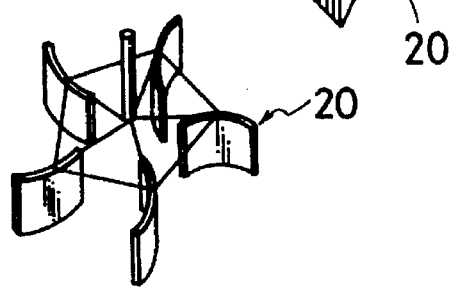
Figure 25A:
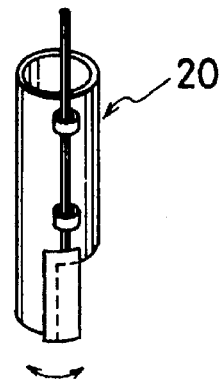
FIGS. 25(a) and (b) are perspective views of two scrapers used in the method of this invention.
Figure 25B:
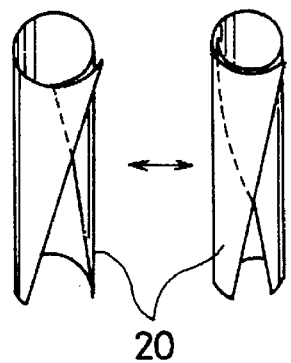
Figure 35A:
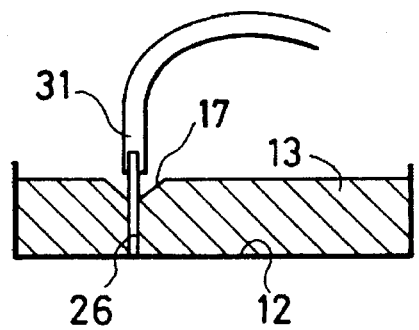
FIGS. 35(a), 35(b) and 35(c) are, respectively, a sectional view of a cavity formed using the scraper of FIG. 32, a sectional view of the cavity, and a sectional view showing the cavity filled with a different type of particles.
Figure 35B:
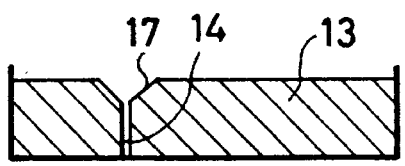
Figure 35C:
Figure 36:
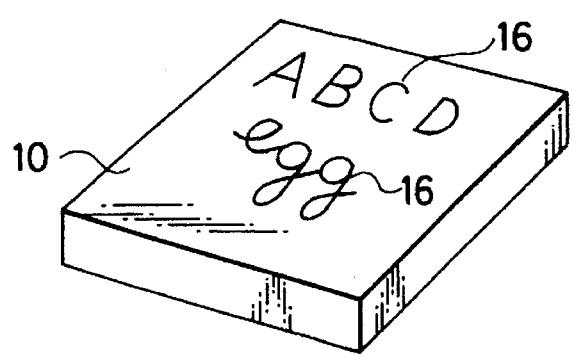
FIG. 36 is a perspective view showing a shaped article formed using the scraper of FIG. 34.

While for convenience the following description will be limited to the examples shown in FIGS. 1 to 36, the invention is capable of producing a variety of other forms by varying the shape and movement of the scraper. FIG. 1 shows an example of a shaped article having an arrow pattern, FIGS. 5 and 31 show an example of a shaped article with a one-stroke pattern, FIG. 8 shows an example of a shaped article patterned with the letter B expressed in dots, FIG. 10 shows an example of a shaped article patterned with a circle, FIGS. 14 and 15 show examples of shaped articles with ellipsoid patterns, FIG. 17 shows an example of a shaped article patterned with a lightning pattern, and FIG. 36 shows an example of a shaped article patterned with letters of the alphabet.

Although the particles used to produce a particle course on a base surface, and different particles used to charge cavities, may, after being dried, have absorbed one or more of water, oil, lubricant-bonding agent, solvent, setting agent or plasticizer, they are not kneaded with water, oil, lubricant-bonding agent, solvent, setting agent or plasticizer and are in a dry state readily broken up for supply.

FIG. 1 shows a shaped article 10 on which an arrow pattern has been formed on a backing course 11. One side of the arrow is expressed by a thick line 16a of unchanging width, and the other side by a line 16b that changes from thin to thick. This shaped article can be formed in accordance with a first method of the invention comprising moving a scraper in the formed particle layer in accordance with the pattern to be expressed, and charging the cavity thus formed with a different type of particles. To do this, first a dry particle course 13 is formed on a base surface 12 such as the bottom plate of a form. A scraper 20 constituted by a thin plate 21, as shown in FIG. 2(a), is then pushed down into the particle layer at point A of FIG. 3 until the lower edge reaches the base surface 12. The scraper 20 is then moved up in a straight line at an angle of 45 degrees towards B1. During this movement, the scraper 20 is maintained at the same angle (45 degrees, in this example) relative to its direction of advance. As shown by FIG. 4(a), the movement of the scraper 20 cuts the particle course 13 vertically at one side and at the other side pushes the particles up into a ridge formation as it leaves a cavity 14 formed in its wake. This cavity is then filled with different particles 15, right down to the base surface, as shown in FIG. 4(b), to thereby form a patterned shaped article. The scraper 20 is then reinserted at point A of FIG. 3 and moved down in a curving movement at an angle of 45 degrees to B2. During this movement the angle of the scraper relative to the direction of advance is gradually increased from the parallel. This forms a cavity that is narrow near A and broadens as it approaches B2. The cavity is then filled with a different type of particles, producing the shaped article of FIG. 1. The particles are then allowed to set into an integral mass, either as they are or after being smoothed and/or overlaid with a backing course, if required.

In this example the scraper 20 in the form of the thin plate 21 is used and the angle of the scraper relative to the direction of advance is changed to change the line thickness. However, the expression of line width is not limited to this example, and various line widths can be expressed by varying the shape and/or material of the scraper and by varying the angle of contact between scraper and base surface. Although for simplicity the explanation refers to the scraper being reinserted at point A and moved toward B2, the scraper can instead be moved from B1 to A to B2, for example. It is possible to utilize the fact that when a thin plate is used as the scraper, nothing will be expressed if the scraper is moved without setting it at an angle relative to the direction of advance. As the scraper is a thin plate, it could for example be moved from point A to point B3 without producing an expression cavity by not setting the scraper at an angle relative to the direction of advance. While the height of the scraper can be either equal to or greater than the thickness of the particle course, for ease of handling it is preferable for the scraper to be slightly taller than the particle course. It is to be understood that while the term scraper is used, the meaning of scrape, as applied to what is done by the movement and operation of the scraper, encompasses raking, plowing, digging and the like.

The cavity formed by the scraper can be filled by hand or by any other method. In the case of the scraper 20 shown in FIG. 2(b) the particles can be supplied from a particle source tank to a supply port 12 affixed to the scraper, via a tube linking the tank and the supply port 22, or the arrangement shown in FIG. 2(c) can be used in which the particles are supplied from a tank 23 arranged directly over the supply port, which can be opened or closed by a gate 23'.

FIG. 5 shows a shaped article 10 on which a pattern 16 has been formed consisting of a single stroke of uniform width. This shaped article is formed in accordance with the method of this invention, using the scraper 20 of FIG. 6(a) comprising a U-shaped member 24 rotatably affixed to a shaft 25. First, a dry particle course 13 is formed on a base surface 12 such as the bottom plate of a form. The U-shaped member 24 is then inserted into the particle layer at point A of FIG. 5 until the lower edge contacts the base surface 12, and is then moved toward B in a spiral motion to form the pattern. During this movement the U-shaped portion of the member 24 remains facing toward the direction of advance, thereby producing a line having a constant width. As shown by FIG. 7(a), the particles of the course 13 are plowed up to form ridges on each side by the movement of the scraper 20, producing a cavity 14 in the wake of the scraper. The cavity 14 is then filled with different particles 15, as shown in FIG. 7(b), thereby forming a shaped article with a dry particle course pattern. The particles are then allowed to set into an integral mass, either as they are or after being smoothed and/or overlaid with a backing course, if required. In this example the pattern is expressed by a line of unchanging width. However, the expression of line width is not limited to this example, and can include various line widths produced by varying the shape and/or material of the scraper and by varying the angle of contact between scraper and base surface. For example, when a scraper is used such as the cylindrical scraper 27 having an opening 27' on the opposite side to the scraping side, as shown in FIG. 6(b), the cavity that is created can be charged with particles supplied through the cylinder, and the width of the line thus produced can be controlled by rotating the cylinder 27 to change the position of the scraping surface and the direction in which the particles are supplied, or by implementing the advance with the reverse side of the scraper facing toward the front and particles not being supplied, and the line width can also be changed by changing the angle of contact between the base surface and the scraper. It is therefore possible to produce the same pattern as the one shown in FIG. 5, or to produce a one-stroke pattern in which the line width is not constant. If the opening 27' is the same height or higher than the thickness of the dry particle course 13, by supplying the different type of particles 15 via the cylinder it is possible simultaneously to perform the production and filling of the cavity illustrated by FIG. 7(a) and FIG. 7(b). If an opening 27' is used having a height that is less than the thickness of the dry particle course 13, the simultaneous charging of the cavity results in a filled pattern portion that is lower than the particle course, producing a pattern sunk into the material of the course.

In the case of the shaped article 10 shown in FIG. 8, the surface on which a pattern is to be formed is regarded as being divided into a matrix of regions each corresponding to one dot of a pattern. In this case the pattern is a letter B expressed by sloping lines of a uniform width, each constituted by individual dots. This shaped article is formed by the method of this invention using the scraper 20 of FIG. 9(a) consisting of a thin rod 26. A dry particle course 13 is formed on a bottom plate of a form as the base surface 12. The scraper 20 is then inserted into the particle layer at point A1 of FIG. 8 until the lower edge contacts the base surface 12, and is moved to form a straight line going toward B1, and this process is repeated from A2–B2 through to A14–B14, producing the letter B. As shown by FIG. 7(a), the particles of the course 13 pushed out of the way by the advance of the scraper form ridges on each side, and a cavity 14 is formed in the wake of the scraper which is then filled with different particles 15 as shown in FIG. 7(b), thereby producing the patterned shaped article. The particles are then allowed to set into an integral mass, either as they are or after being smoothed and/or overlaid with a backing course, if required. A scraper can be used comprising a plurality of rods affixed to a plate or the like. For example, the type of configuration shown in FIG. 9(b) can be used in which the scraper 26 is a line of seven rods in a block arranged so that rods not required can be retracted up into the block, providing a further increase in productivity. In this case the scraper rods are moved one line at a time, and charging is also done a line at a time. Or, the multi-rod scraper 26 of FIG. 9(b) can be used, and connected to a tube through which the different particles are supplied to fill the cavities thus formed. The scraper movement is not limited to the pattern of this example expressed by straight line movements as shown in FIG. 8, but can also be moved in other ways, such as in broad swings, or in circles, or in a spiral starting from the center. In such cases the size of the pattern elements (such as dots) will be determined by the degree of movement.

Figure 12:
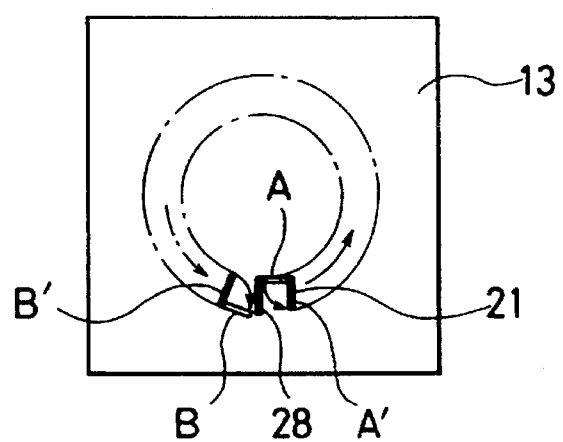
FIG. 12 illustrates how the scraper is moved to form the shaped article of FIG. 10.
Figure 13A:
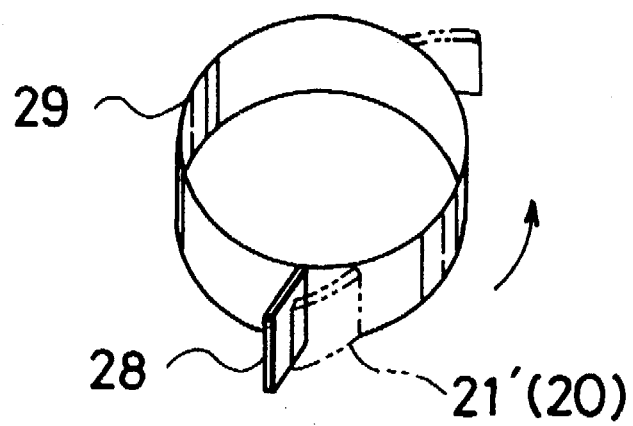
FIGS. 13(a) and (b) show a perspective view of a guide with an end stop, and a view illustrating how the scraper is moved to form the shaped article of FIG. 10, using the guide.
Figure 13B:
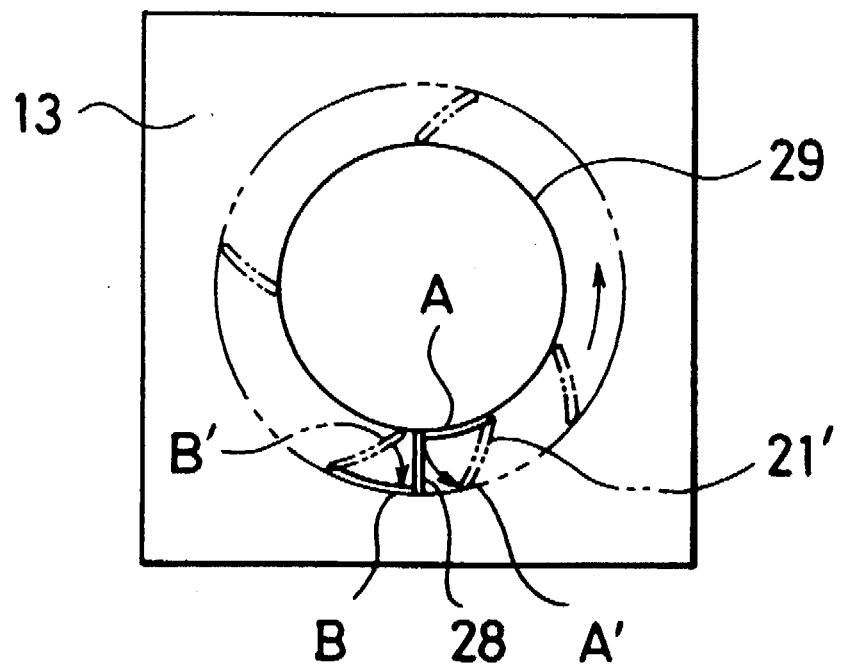

FIG. 10 shows a shaped article 10 having a doughnut-shaped ring pattern 16. This shaped article is formed in accordance with the first method of this invention using the scraper 20 of FIG. 11 consisting of a curved plate 21'. A dry particle course 13 is formed on a bottom plate of a form as the base surface 12 and a cavity formed in using the same type of scraper procedure as in the case of the shaped article of FIG. 1. To neatly align the start and end point of the pattern, end stops 28 such as those shown in FIG. 23 can be inserted beforehand into the dry particle course 13. With reference to FIG. 12, the pattern is then started by inserting the scraper 20 at point A in contact with end stop 28 and moving it along the end stop 28 to point A'. The scraper 20 is then moved all the way around to B', and then along the end stop to B, and the cavity thus formed is then filled with different particles. Alternatively, the particle course can be formed after first putting in place the round auxiliary guide 29 equipped with an end stop 28 shown in FIG. 13(a), or the auxiliary guide 29 can be inserted after the particle course has been formed, and the curved plate 21' scraper 20 shown in FIG. 11 used having the same curvature as the auxiliary guide 29. In this case, with reference to FIG. 13(b), the scraper 20 is inserted along the auxiliary guide 29 and with one end in contact with end stop 28, and with the other end in contact with the guide 29 the first end is moved along the end stop 28 to A'. The scraper 20 is then moved along the guide 29 to B' without changing the angle of contact between the scraper 20 and the guide, and from B' the scraper 20 is moved to B along end stop 28. The cavity thus formed is then filled with different particles. The shaped article having a ring pattern is then completed by removing the scraper 20 and guide 29 from the dry particle course 13. The particles are then allowed to set into an integral mass, either as they are or after being smoothed and/or overlaid with a backing course, if required. The auxiliary guide 29 enables a neat circle to be readily produced, even by manual or other such means, and can also be used to readily produce other patterns.

FIGS. 14 and 15 each show a shaped article 10 with an ellipsoid pattern. 16 each produced by using the same scraper to form cavities that are then filled with a different type of particles. This shaped article is formed in accordance with the first method of this invention using the scraper 20 of FIG. 16 consisting of a strip of material bent into an ellipsoid. A dry particle course is formed on a bottom plate of a form as the base surface 12. To form the pattern of FIG. 14, the scraper 20 is inserted and moved along the long axis of the ellipsoid, while the pattern of FIG. 15 is formed by rotating the scraper 20 by about five degrees around an axis formed by the center of the ellipsoid. The cavity 14 thus created in each case is then filled with a different type of dry particles 15. The patterns are finished in the same way as in the preceding examples.

FIG. 10 shows a shaped article 10 with a lightning pattern 16 produced using a scraper 20 comprised of a pair of plates each having the same lighting shape. To form this shaped article in accordance with the first method of this invention, the scraper 20 shown in FIG. 18(a) consisting of two strips of material bent into the zigzag shape of a lightning bolt is inserted into the dry particle course 13 so it rests on the base surface 12. As indicated by FIG. 18(b), the two parts of the scraper 20 are moved apart to form a cavity 14 which is then filled with a different type of particles 15. Subsequent steps are the same as those of the preceding examples.

The shaped article patterned with an arrow shown in FIG. 1 can be formed in accordance with a second method according to the invention comprising using both scraping and suction to remove particles and form a cavity corresponding to the pattern to be expressed, and then filling the cavity with a different type of particles. As shown in FIG. 29, the scraper 20 used consists of a thin plate 21 integrated with a suction port 31 of an aspirator 30. A dry particle course 13 is formed on a bottom plate of a form as the base surface 12. The plate 21 is inserted into the dry particle course 13 at point A of FIG. 3 until the edge contacts the base surface 12, and is then moved up in a straight line at an angle of 45 degrees towards B1 while being maintained at the same angle (45 degrees, in this example) relative to its direction of advance. As shown by FIG. 30(a), the movement of the plate 21 cuts the particle course 13 vertically at one side, while away, create side surplus particles are sucked away, creating a chamfered top edge, not the ridge-like formation produced in the case of the first method of the invention. The cavity thus formed in the wake of the scraper 20 is then filled with a different type of particles 15, producing the arrangement of FIG. 30(b). The plate 21 is then reinserted at point A of FIG. 3 and moved down in a curving movement at an angle of 45 degrees to B2, forming another cavity that is filled with the different type of particles 15, thereby finishing the patterned shaped article. The particles are then allowed to set into an integral mass, either as they are or after being smoothed and/or overlaid with a backing course, if required. While the height of the scraper can be either equal to or greater than the thickness of the particle course, for ease of handling it is preferable for the scraper to be slightly taller than the particle course. It is to be understood that while the term scraper is used, the meaning of scrape, as applied to what is done by the movement and operation of the scraper, encompasses raking, plowing, digging and the like.

The filling of the scraped out cavity with the different type of particles 15 can be done by hand or by any other method. The particles can be supplied from a particle source tank to a supply port integrally affixed to the scraper, via a tube linking the tank and the supply port, or using an arrangement in which the particles are supplied from a tank disposed directly over the supply port. Suction removal of surplus particles enable an angle of repose to be imparted to the upper portion of the cavity by sloping the edge. This is advantageous when the cavity will not be filled immediately. If the cavity is to be filled immediately, it can be adjusted according to the surplus amount removed.

Figure 33A:
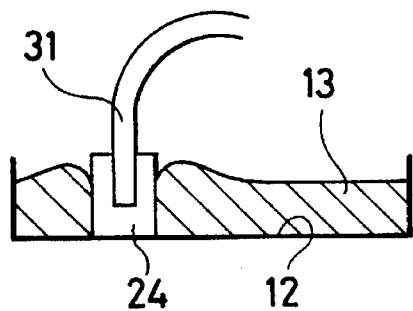
FIGS. 33(a) and (b) are a sectional view of a cavity formed using the scraper shown in FIG. 32, and a sectional view showing the cavity filled with a different type of particles.
Figure 33B:
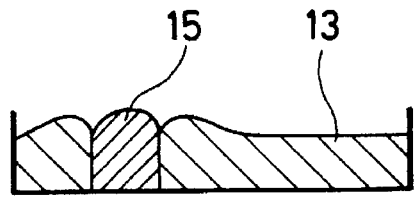

The shaped article 10 shown in FIG. 31 has the same one-stroke pattern of uniform width as the shaped article 10 of FIG. 5, but the pattern is started at a different point. This shaped article is formed in accordance with the second method of this invention, using the scraper 20 of FIG. 32 constituted by a U-shaped member 24 rotatably affixed to a shaft 25. A dry particle course 13 is formed on a bottom plate base surface 12 into which the U-shaped member 24 is inserted at point A of FIG. 31 until the lower edge is in contact with the base surface 12. The U-shaped member 24 is then moved toward B in a spiral motion while particles at its position are removed by suction through the suction port 31. During this movement the U-shaped portion of the member 24 remains facing toward the direction of advance, thereby producing a line groove having a constant width. As shown by FIG. 33(a), the particles of the course 13 are thus plowed up into ridges on each side by the advance of the scraper 20, producing a cavity in its wake. The cavity is then filled with different particles 15, as shown in FIG. 33(b), producing a shaped article with a dry particle course pattern. The particles are then allowed to set into an integral mass, either as they are or after being smoothed and/or overlaid with a backing course, if required. Continuing to apply suction via the suction port 31 from A to B ensures the thorough removal of particles not moved by the scraper, even over a very uneven base surface, making it possible to produce sharply defined patterns and giving the start and end points A and B the same neatly rounded-off finish shown in FIG. 31. This is one difference from the patterned shaped article 10 of FIG. 5 produced by the first method of the invention. In this example the pattern is expressed by a line of unchanging width. However, the expression of line width is not limited to this example, and can include various line widths produced by varying the shape and/or material of the scraper and by varying the angle of contact between scraper and base surface.

Figure 34:
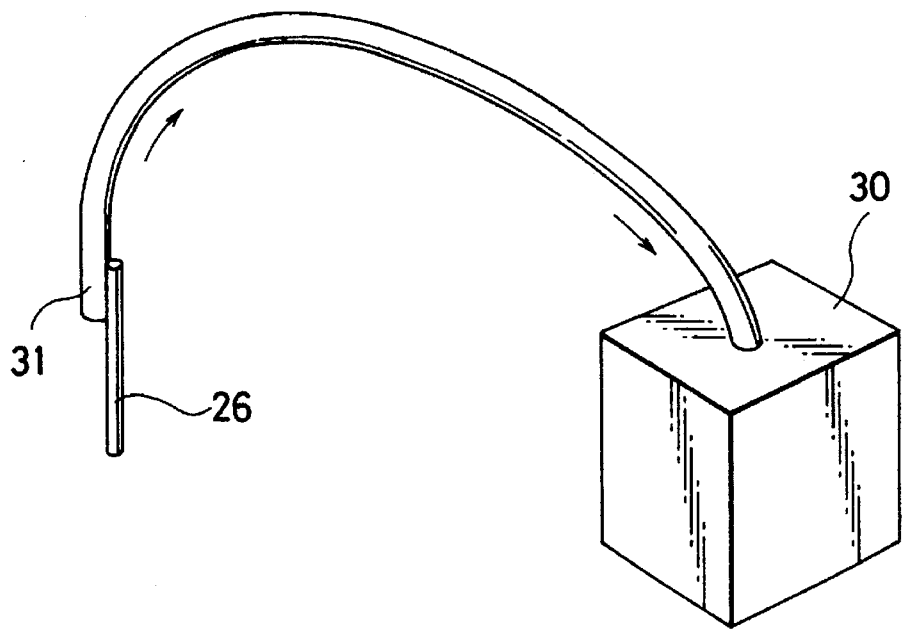
FIG. 34 is a perspective view of another scraper having a suction port, used in the method of this invention.

In the case of the shaped article 10 shown in FIG. 8, the pattern surface is regarded as being divided into a matrix of regions each corresponding to one dot of the pattern, which in this example is a letter B. This shaped article is formed by the second method of this invention using as the scraper 20 a rod 26, as shown in FIG. 34, integrally associated with the suction port 31 of an aspirator 30. A dry particle course 13 is formed on a bottom plate as the base surface 12. The rod 26 is inserted into the particle layer at point A1 of FIG. 8 until the lower end is in contact with the base surface 12, and it is then moved to form a straight line to B1, a process which is repeated from A2–B2 through to A14–B14, resulting in the formation of the letter B. Where this method differs from the first method is that surplus particles pushed out to each side by the progress of the rod 26 are immediately removed by suction while at the same time forming an angle of repose 17' at the top part of the walls, as shown in FIGS. 35(a) and (b), producing a cavity 14 in the wake of the scraper. At an appropriate time after the scraping operation, the cavity 14 is filled with different particles 15, as shown in FIG. 35(b), thereby completing the patterned shaped article. The particles are then allowed to set into an integral mass, either as they are or after being smoothed and/or overlaid with a backing course, if required. A scraper 20 can be used comprising a plurality of rods affixed to a plate or the like or having an integrally associated particle supply port. Used in conjunction with auxiliary members or jigs, this would allow the use of various pattern expression and filling methods. The scraper movement is not limited to the pattern of this example expressed by the straight line movements shown in FIG. 8, but includes other movements such as broad oscillations, circles and spirals starting from the center. In such cases the size of pattern elements (dots) are deterred by the degree of movement. The sharpness of the lines that can be drawn with this method makes it possible to readily form the type of lettering patterns 16 shown in FIG. 36.

The scraper can be moved with the rod 26 at the front and the suction port 31 behind, or with the suction port at the front and the rod behind. However, it is preferable to have the suction port at the front and the rod behind, as this concentrates the suction force in the small space between the scraper rod and the particles not yet moved, so that the scraper 20 acts like a smoother, resulting in clear-cut vertical walls that provide sharper lines. The formation of the angle of repose can be controlled by adjusting the strength of the suction and/or the shape of the suction port. Whether it is better to form it or not can be decided according to the timing of the charging.

In all cases the type of scraper used and how it is used is a matter of choice. The patterns and shaped articles are not limited to those described above, but can be expanded by using other base surface materials, combined also with other auxiliary forms. It is to be understood that while the term scraper is used, the meaning of scrape, as applied to what is done by the movement and operation of the scraper, encompasses raking, plowing, digging and the like, and the range of patterns that can be expressed can be further expanded by combinations of these actions. The scraper can be formed of any material such as metal, ceramic, plastic, rubber, paper, wood, unwoven fabric, woven fabric or the like having sufficient hardness to plow through the particles. It is preferable to use materials that ensure close contact between the base surface and the scraper, as this helps to realize sharply defined patterns.

Figure 26A:
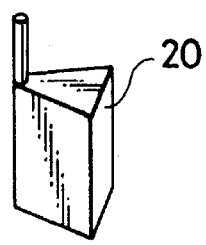
FIGS. 26(a), 26(b), 26(c) and 26(d) are, respectively, a perspective view of a scraper used in the method of this invention, a plan view of a cavity formed using the scraper, a sectional view along line Y—Y of FIG. 26(b), and a plan view showing the cavity filled with a different type of particles.
Figure 26C:
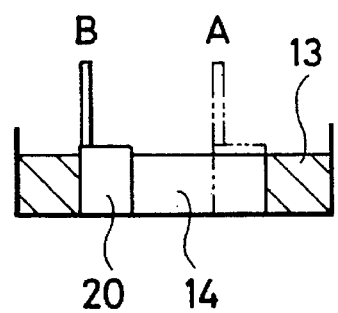
Figure 26B:
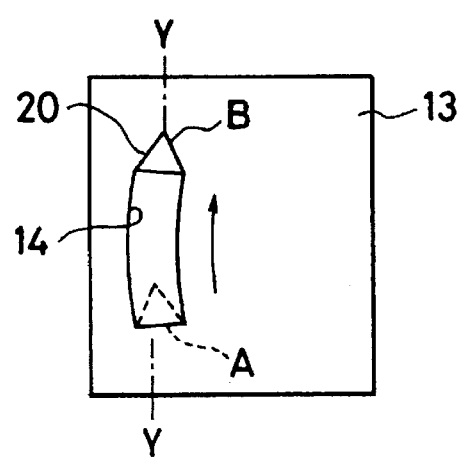
Figure 26D:
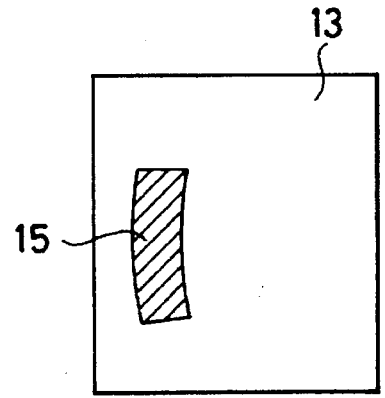

While the height of the scraper can be either equal to or greater than the thickness of the particle course, for ease of handling it is preferable for the scraper to be slightly taller than the particle course. The scraper can be simple in shape, such as the plates of FIG. 2 and the rod of FIG. 9, or square, curved, V-shaped or U-shaped, or skirted or with a bow shape such as in such as in FIG. 19 or FIG. 22(c), or in the shape of a square or oval upright, in addition to the round cylindrical shape shown in FIG. 6(b), while other shapes include the triangular and star-shaped arrangements of FIGS. 22(a) and (b), and the configuration with the opening 27' shown in FIG. 6(b). The scraper can be configured as multiple rod members arranged in a line or matrix that can be folded, or the type of arrangement shown in FIG. 9(b) can be used in which rods not required can be retracted up into the block. The scrapers could be arranged so that they can be changed, such as to select one with a different width, in the example shown in FIG. 24, for example, or one with a different rear opening configuration, with reference to the examples of FIG. 25, or the arrangements shown in FIG. 20 and FIG. 21 in which the scrapers are pairs of plates that can be brought together or separated, and the orientation also changed. With the scraper of FIG. 26(a), the scraper can be inserted into a dry particle course 13 at point A and moved to point B as shown in FIGS. 26(b) and (c), enabling the particles entering the scraper at point A to be transported to point B and a cavity 14 to be formed which is then filled with different particles 15 to produce the type of pattern shown in FIG. 26(d). However, the scrapers are not limited to the ones described above, but can use many other shapes and arrangements.

Scrapers used singly or in line or matrix arrays of rod-shaped or cylindrical members can be directly controlled by computer to form patterns, making it possible to increase productivity. It is preferable to use an arrangement in which scraper angle and speed, and particle supply, can be controlled to enable patterns to be freely changed or modified, which will make it possible to produce complex, sophisticated patterns. Using end stops such as those shown in FIG. 23 to guide the start and end point scraper movements provides patterns with neat start and end points.

For the base surface, it is possible to use the bottom plate of a form or a sheet, belt, board or the like, the bottom plate of a double action or other type press, the bottom plate of a form placed on a conveyor, or a belt conveyor or other such endless surface. The particle course can be placed on a board, sheet or other such base surface either as it is or turned upside down. Although the base surface can be of any material, it is preferable to use a material that readily slides such as glass, ceramics, plastic, metal and the like, as such a material will enable the scraper to remove particles more thoroughly. As the material for the base surface it is also preferable to use rubber, sponge, paper, unwoven fabric or other somewhat bulky or elastic material. This is because when the scraper is pressed onto a base surface formed of such a material the bulk or elasticity of the material enables absorption of play between the base surface and the scraper, and therefore better scraper action and sharper pattern lines. A similar effect can also be obtained by pressing all or part of the scraper with a spring or an elastic body made of rubber or the like or by attaching thread, string or other such elastic material to the base surface portion contacted by the scraper. In this case too, it is preferable to use a slippery base surface material as such a material will enable the scraper to remove particles more thoroughly. It is also preferable that the unwoven fabric, woven fabric, paper or the like used for the base surface is gas-permeable, liquid-permeable, and also liquid-absorbent as this assists deaeration, thereby removing excess liquid and ensuring the shaped article is of uniform strength.

In any of the arrangements the scraping operation can be done manually or by mechanical means such as a robot. If necessary a vibrator can be affixed to the scraper. It is for example desirable to apply vibration to the type of scraper shown in FIG. 6(b), as this enhances particle cave-in and the resulting pattern. In any of the arrangements the dry particle courses can be formed by various methods such as a squeegee type course forming method, or by using a sliding supply tank, or by using a supply tank with a slitted nozzle, or a rotary feeder, or by employing a dense cellular body, bristling body belt or the like. The cavity formed by the scraper can be filled by any method including by hand. In the case of the scraper shown in FIG. 2(b) the particles can be supplied from a particle source tank to a supply port affixed to the scraper, via a robe linking the tank and the supply port, or the arrangement shown in FIG. 2(c) can be used in which the particles are supplied from a tank arranged directly over the supply port, which can be opened or closed by a gate. Particles can also be supplied in fixed amounts by a pipe conveyor or the like, or using compressed air or other such method. The pattern is formed by the charging the cavity from above with different particles, which are fed onto the base surface in the cavity.

In any of the arrangements, the press plate below a double action press can be used as the base surface, and after a pattern has been formed on the press plate, the particles can be pressed into a solid mass with the press. In addition, it is possible first to cause a plurality of patterned shaped articles to set as one large one which is later cut into individual articles.

Figure 27:
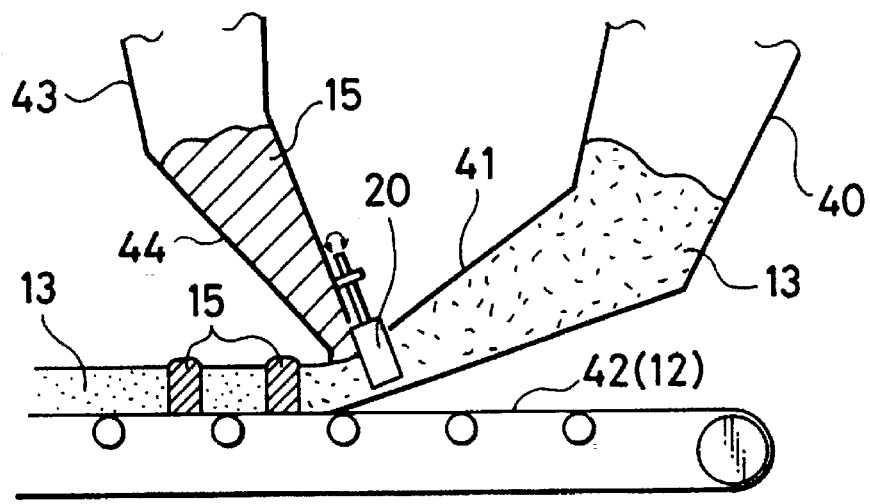
FIG. 27 is a sectional view of an apparatus for continuously forming patterned shaped articles according to the method of this invention.
Figure 28:
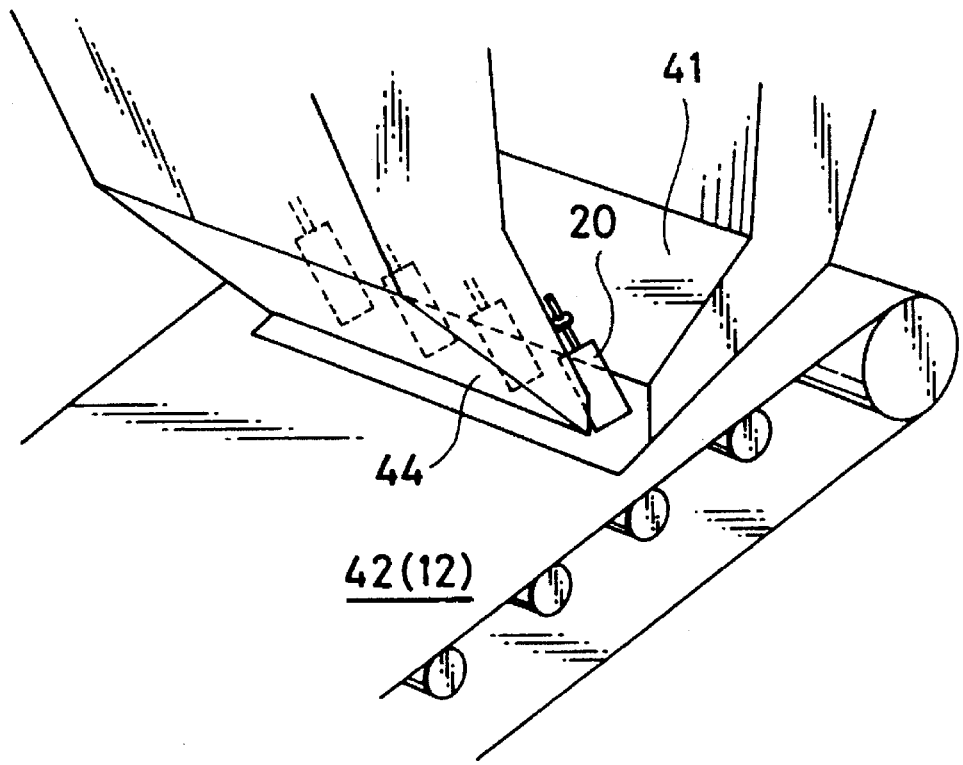
FIG. 28 is a perspective view of the principal parts of the apparatus shown in FIG. 27.
Figure 32:
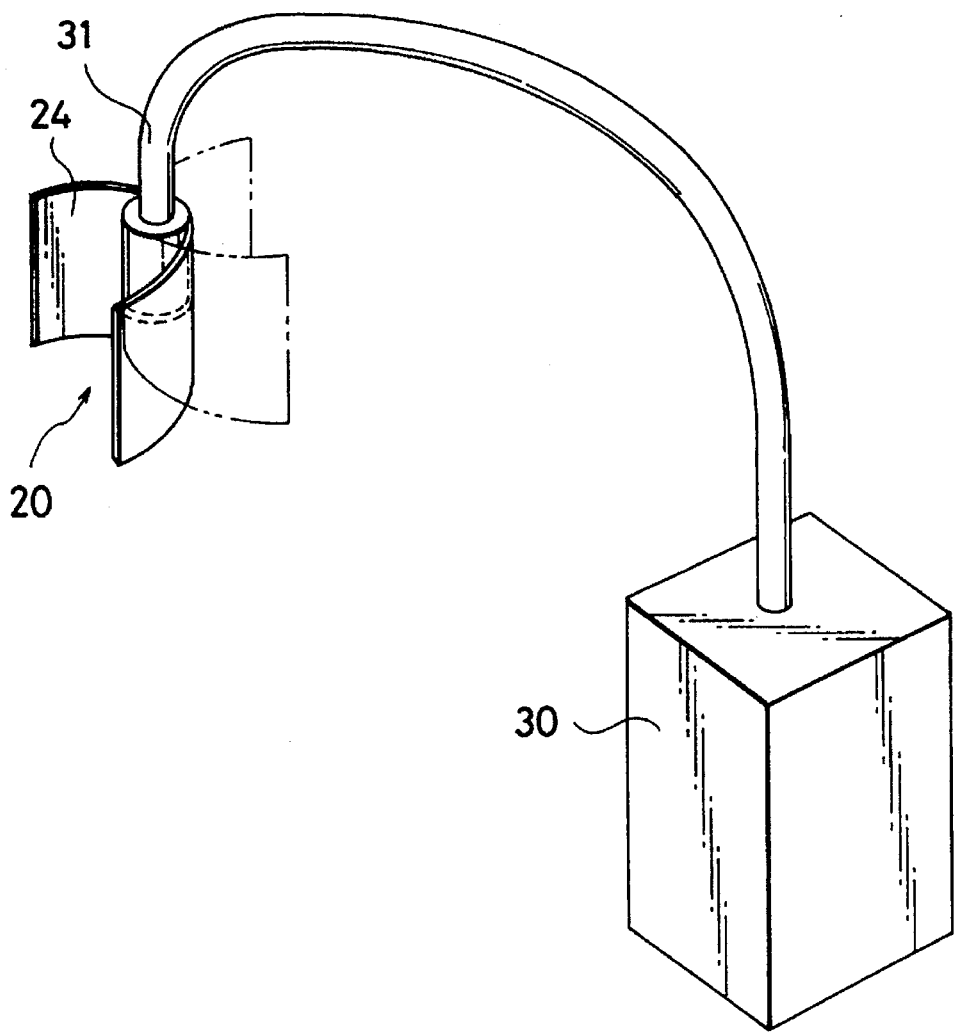
FIG. 32 is a perspective view of a scraper with a suction port, used to form the shaped article of FIG. 31.

Also, patterned shaped articles can be formed on a continuous basis by using a scraper to form a cavity in a dry particle course that is continuously formed on an endless conveyor, and following this by filling the cavity with different particles to produce a pattern. An apparatus for this purpose is illustrated by FIGS. 27 and 28. Particles to form the dry course are fed from a hopper 40 via a chute 41 onto the upper surface of an endless conveyor 42 constituting the base surface. The scrapers 20 used to form the pattern cavity in the dry particle course 13 are provided at the lower end of the chute 41. The different particles 15 used to fill the cavity are supplied from another hopper 43 via a chute 44 which feeds the particles into the cavity behind the scraper. For this, the chutes 41 and 44 are arranged in offset opposition. The patterned shaped article thus formed as a continuous strip is cut into suitable lengths and allowed to set. After the strips have set, they are subdivided into the required sizes.

This second method according to the invention is preferable as surplus particles pushed out to each side by the progress of the scraper are immediately removed by suction while at the same time an angle of repose is formed at the top part of the walls, so that even with very uneven base surfaces, particles not removed by the scraper can be thoroughly removed, resulting in sharply-defined patterns. As shown in FIG. 31, the start and end points can be given the same finish. It is preferable to use this method in conjunction with end stops of different shapes, as this enables the start and end points to be neatly finished in various shapes. A scraper can be advanced with the scraper rod at the front and the suction port behind, or with the suction port at the front and the rod behind. However, it is preferable to have the suction port at the front and the rod behind, as this concentrates the suction force in the small space between the scraper rod and the particles not yet moved, so that the scraper acts like a smoother, resulting in clear-cut vertical walls and sharper pattern lines. The formation of the angle of repose can be controlled by adjusting the strength of the suction and/or the shape of the suction port. It is better to decide whether or not to form it based on the timing of the charging. Forming the angle of repose is advantageous because the resulting stabilization of the cavity against cave-in provides a greater range of freedom in selecting the method and time of particle charging.

In the method of the present invention, dry particle material is used for forming a course on the base surface. Although the material is dry, it may have absorbed one or more of water, oil, lubricant-bonding agent, solvent, setting agent and plasticizer, if it is not kneaded with water, oil lubricant-bonding agent, solvent, setting agent or plasticizer and is in a dry state readily amenable to pulverization for supply to the base surface. On the other hand, the material of which the backing layer is formed may be either dry or wet with one or more of water, oil lubricant-bonding agent, solvent, setting agent and plasticizer. Otherwise, a plate of metal, wood, cement, glass or ceramic or a sheet of paper, unwoven fabric, woven fabric, knit fabric, plastic, etc. may be used as the backing layer. In this case, the plate or sheet serves as the base surface. In addition, any other existing shaped article may be used as a base surface to be formed with a course that is set together therewith.

The materials to be supplied may differ from one another depending on the shaped article to be produced. Otherwise, in the finished state they are required to differ from one another in color, luster, texture and the like.

In producing a concrete shaped article, the course material is dry and consists mainly of cement powder, resin or a mixture thereof and may additionally include at least one of a pigment and fine aggregates. The material for a backing layer consists mainly of cement powder, resin or a mixture of cement powder and resin, the mixture further containing a fine aggregate and, if necessary, additionally containing a pigment and at least one of coarse aggregates and various kinds of fibers. The backing material may either be dry like the course material or in the form of a concrete slurry obtained by kneading with water, etc.

Both the materials for the course and the material for the backing layer may additionally include wood chips as aggregates or fine aggregates and may further include as blended therewith crushed or pulverized granite, crushed or pulverized marble, slag, light-reflecting particles, inorganic hollow bodies such as Shirasu balloons, particles of ceramics, new ceramics, metal, ore or other substances. They may also contain as additives a congealing and curing promoter, a waterproofing agent, an inflating agent, and the like.

All the materials are supplied to a form etc. and are allowed to set into an integral mass. Otherwise after the material has been supplied, a prescribed amount of water is supplied to all portions of the interior of the form etc., thereby setting the materials into an integral mass within the form etc. If a wet material is used for the backing layer, the amount of water supplied is reduced in view of the water contained in the wet material. When a plate of metal, wood, cement, glass or ceramic or a sheet of paper, unwoven fabric, woven fabric or knit fabric is used as the backing layer, for example, it can be allowed to set integrally with the course. An asphaltic concrete shaped article can be produced using a thermal fusion material such as asphalt.

In producing an artificial stone shaped article, the dry materials for the course may, for example, be constituted of at least one of rock particles, plastic particles, new ceramic particles, glass particles, plastic particles, wood chips and metal particles and may, as found necessary, further have mixed therewith a pigment etc. Also, the material for the backing layer may, for example, be constituted of at least one of rock particles, ceramic particles, new ceramic particles, glass particles, plastic particles, wood chips and metal particles and may, as found necessary, further have mixed therewith a pigment etc. The material for the backing layer may be either dry or wet. The wet material for the backing layer contains a setting agent. The setting agent contained in the wet material for the backing layer or a setting agent for setting the dry materials for the course and/or the dry material for the backing layer is composed mainly of a mixture of cement powder and water, a mixture of cement powder, resin and water, a mixture of resin and water, a mixture of resin and solvent, or a mixture of resin, water and solvent and may further contain particles of at least one of rock, ceramic, new ceramic, glass and plastic and may, as found necessary, be kneaded with a pigment or colorant and have mixed therewith various kinds of particles, various kinds of fibers, various kinds of mixing agents and various kinds of additives. The various kinds of particles include particles of slag, fly ash and fine light-reflecting substances. The various kinds of fibers include metal fibers, carbon fibers, synthetic fibers and glass fibers. The various kinds of mixing agents and additives include shrink proofing agents, congealing and setting promoters, delaying agents, waterproofing agents, inflating agents, water reducing agents, fluidizing agents, and the like.

For enhancing the adherence of the setting agent with the aforementioned dry materials, the dry materials can be sprayed with or immersed in water, solvent or surface treatment agent, but are not kneaded with water, solvent or surface treatment agent and are in a state readily amenable to pulverization.

All the materials can be set into an integral mass within a form etc. by vacuum-suction treatment, centrifugal treatment or other such treatment for spreading the setting agent between adjacent particles or by using a mixture of an aggregate and a setting agent as the material for the backing layer. When a plate of metal, wood, cement, glass or ceramic or a sheet of paper, unwoven fabric, knit fabric, woven fabric or plastic is used as the backing layer, the course can be allowed to set integrally therewith.

For producing a ceramic shaped article or the raw product for a ceramic shaped article, the dry materials for the course are mainly particles of one or more of clay, rock, glass, new ceramic, fine ceramic and glaze with or without a pigment or colorant added thereto. Although the materials are dry, they may be ones which have absorbed some water or been added with a lubricant-bonding agent if they are not kneaded with the lubricant-bonding agent or water and are in a state readily amenable to pulverization. The material for the backing layer is constituted mainly of particles of one or more of clay, rock, glass, new ceramic and fine ceramic and may additionally contain a pigment and a colorant. In the finished state, the backing layer is required to differ from the course in color, luster, texture and the like and may be either dry, similarly to the course, or made wet by kneading with water or a lubricant-bonding agent. In addition, either the materials for the course or the material for the backing layer may have further mixed therewith inorganic hollow bodies such as Shirasu balloons, and particles of ceramic, metal or ore and may have added thereto various kinds of foaming agents, fluidization-preventing agents, supernatant agents, lubricating agents, bonding agents and adherence promoters as additives.

The materials supplied into a form etc are allowed or caused to set into an integral mass without adding or by adding a predetermined amount of water or lubricant-bonding agent to plasticize them and applying pressure to the resultant mixture. The set integral mass is removed from the form etc. and used as a raw product. The raw product is sintered to obtain a ceramic shaped article. Otherwise, the materials supplied into a refractory setter or similar form are melted or fused by heating to obtain an integral mass, and the integral mass is removed from the setter. Otherwise, a course of particles is laid on a plate of metal, glass or ceramic, partially removed to form a cavity, supplied at the cavity with different dry particles, and melted or fused by heating to be integral with the plate. A patterned shaped article of enamel, stained glass or crystalline glass and similar patterned shaped articles can be produced by any of these methods.

In producing a raw product to be sintered into a metal shaped article, the dry materials for the course are mainly particles of one or more of metals and alloys and may, as found necessary, further have mixed therewith a lubricant. Although the materials are dry, they may be ones which have absorbed the lubricant and are in a state readily amenable to pulverization. The materials for the backing layer are constituted mainly of particles of one or more of metals and alloys and may be either dry or made wet by kneading with a lubricant.

Examples of the lubricant used herein include zinc stearate and other lubricants. The dry materials for the course or the materials for the backing layer may further contain a bonding agent and other additives.

All the materials are supplied into a main form etc., pressed therein and removed therefrom to obtain the raw product for a metal shaped article. The raw material is sintered into a metal shaped article. A metal shaped article may be produced by supplying all the materials onto a sheet of metal, glass, ceramic, etc., applying pressure to the resultant composite to obtain an integral mass of raw product, and sintering the integral mass.

The dry materials for the course used in producing a shaped article having an impasto layer are various kinds of powdered paint, and the material for the backing layer is a plate, sheet or the like of metal, wood, cement or ceramic. The various kinds of powdered paint include acrylic resin, polyester resin, acrylic-polyester hybrid resin, fluorine resin and similar resins having a pigment or colorant added thereto. The materials for the course are laid on the plate, sheet, etc. as a backing layer, supplied at a cavity with another dry material, melted and fused by heating and baked to unite all the layers together. In uniting all the layers together, pressure may be applied to the layers. As a result, it is possible to obtain a plate, sheet, etc. having an impasto layer thereon.

In producing a plastic shaped article, the dry materials for the course are constituted mainly of particles of various kinds of plastics and may additionally contain a pigment or a colorant. The materials may also contain a plasticizer or solvent, but are not kneaded with a plasticizer or solvent and are in a state readily amenable to pulverization. The material for the backing layer may be either dry or made wet by kneading with a plasticizer or solvent. The various kinds of plastics include polyethylene, nylon, polypropylene, polycarbonate, acetal, polystyrene, epoxy, vinyl chloride, natural rubber, synthetic rubber, ABS, PPO, EVO, fluorine resin and other thermoplastics and thermosetting resin. Both the materials for the course and the material for the backing layer may, as found necessary, contain a foaming agent, oxidization preventing agent, thermal stabilizer, bridging agent, other additives and particles of inorganic materials and the like. All the materials are melted or fused into an integral mass by heating, while applying pressure thereto, if necessary. With this method, it is possible to produce a patterned shaped article of foamed styrol, a patterned shaped bathtub or floor tiles of plastic, etc. In this case, the layers may be united with a plate of metal, wood, cement, ceramic or a sheet of paper, unwoven fabric, knit fabric, woven fabric or plastic.

In producing confectionery or other shaped foodstuffs, the dry materials for the course are constituted mainly of particles of one or more of wheat, rice, potato, bean, corn and sugar and may additionally contain seasonings and spices. The materials may also contain oil, water, etc., but are not kneaded with oil, water, etc. and are in a state readily amenable to pulverization. The material for the backing layer may be either dry, similarly to the materials for the course, or made wet by kneading with oil, water, etc. Both the materials for the course and the material for the backing layer may, as found necessary, further contain an inflating agent and other additives. All the materials are supplied into a form etc. and are allowed to set or caused to set without adding or by adding water, oil, etc. to plasticize them into an integral mass. The integral mass is pressed and then removed from the form, etc. to obtain a raw product. The raw product is then baked. Otherwise, all the materials are baked within the form etc. With this method, it is possible to produce various patterned baked confectioneries etc. It is also possible to produce a patterned shaped article melted by heating, such as a patterned chocolate shaped article etc., by using particles of the material melted by heating, such as chocolate etc., and melting and fusing the particles by heating.

The materials that can be used in the present invention are not limited to those set out as examples herein and various other materials can also be used depending on the shaped article to be produced. Moreover, the range of patterned shaped articles that can be produced can be increased by combining various materials that, in the finished state, differ in property, color, luster, texture and the like. When the methods described above have the steps in common with each other, different kinds of materials can be combined with each other. For example, since both the method for producing a metal shaped article and the method for producing a ceramic shaped article require a common sintering step, metal particles and ceramic particles are used together to form a pattern, whereby cloisonne ware can be produced.

The materials used in the method for producing a concrete shaped article and those used in the method for producing an artificial stone shaped article can also be used together.

In the method for producing any of the patterned shaped articles, it is desirable to apply vibration when the materials are supplied onto the base surface so as to ensure smooth movement of the materials. Further, by rubbing with a brush or comb or applying a jet of air or water to the boundary portion between the different kinds of materials for the course, the pattern can be blurred.

In addition, by providing on the base surface or material course a mat of unwoven fabric, paper or other water or oil absorbing material, any excess amount of water, oil, lubricant-bonding agent, plasticizer or solvent can be supplied to any portion deficient in them to uniformly disperse them in the shaped article. As a result, the ratio of the water (auxiliary agents) in the surface to the cement (resins) becomes small and this means that the strength of the shaped article as a whole is enhanced. When an air permeable mat is used in the formation of an article under pressure, degassing is enhanced to obtain a dense article. By vibrating or pressing one or both of the material course and the backing layer when the two layers are being allowed to set into an integral article, the integral article obtained becomes dense and is improved in strength. The article may be reinforced with long fibers, short fibers, wire nets or reinforcing rods by inserting these in or between the two layers. The method of using an article obtained by the sheet making method or extrusion molding method or any of various plates or sheets as the backing layer is applicable to the production of various articles including architectural panels and boards, wall sheets and tiles. The surface of an existing concrete article can be used as the base surface. In this case, the materials for the material course are discharged onto the concrete surface and set to be integral with the existing concrete article.

In the method of producing a shaped article according to this invention, it is possible to produce a shaped article with a curved finished surface by using a deformable mat as the base surface or using a partially or generally deformable form.

This invention makes it possible to freely express line patterns of various widths from an extremely thin line to a bold line. In the case of a pattern of a person's signature in script, for example, the prior art methods are difficult to express an extremely thin line and can only produce a stiff pattern, whereas the method of the invention can naturally express a pattern minutely. Therefore, a signature and the like can be adopted as a pattern to be expressed. Further, a pattern like a picture dram with a single stroke of the brush can also be expressed neatly. Furthermore, a pattern like a venous pattern with lines tapered gradually can also be expressed. From a technical point of view, the method of the invention makes it possible to express a line with the minimum width substantially the same as the diameter of the particles used. The invention is thus able to produce a product that is resistant to abrasion and pleasing to the eye when used, for example, to make sidewalk or pavement tiles patterned with maps, directions or the like.

Another effect of the invention is that since the particle course is formed first, productivity is enhanced since patterns can be expressed by the straightforward operation of scraping the pattern cavity, obviating the need for pattern-specific charging, and thereby greatly reducing the amount of charging work and the like that is required. As a further effect, the invention enables formation of cavity patterns in randomly blended particle courses, making it possible to produce patterns within a complex background. Also, in the case of centrifuged concrete, since the particle course can be formed first and the cavities can be formed and charged to produce the pattern thereafter, the pattern can be easily produced even when high-speed rotation is used. Computer control can be used to produce patterns directly, achieve high production efficiency and freely modify patterns. By making it possible to control the angle and speed of the scraper and the supply of particles, shaped articles can be produced having complex, sophisticated patterns.

These production methods make it possible to easily produce concrete shaped articles, artificial stone shaped articles, raw products for sintering into ceramic shaped articles, meal shaped articles, impasto shaped articles, plastic shaped articles and shaped foodstuffs including confectionery each having a pattern formed on part or all of the surface thereof. The good condition of the patterns of the patterned shaped articles can therefore be maintained even when exposed to surface abrasion. Since the pattern layer is formed by a combination of various kinds of dry materials, the materials can, owing to their cave-in action, be densely charged without any gaps and the boundaries between adjacent materials can be finely expressed, resulting in clear-cut pattern formation.

We claim:

1. A method of producing a patterned shaped article, comprising the steps of:

forming a dry particle course on a base surface;

forming a cavity in a portion of the dry particle course on which a pattern is to be expressed, by moving a scraper located at a prescribed position above the base surface in accordance with the pattern;

charging the cavity with a different type of dry particles; and allowing the particles to set into an integral mass as they are.

2. A method according to claim 1, further comprising the step of overlaying the particles with a backing course before the step of allowing the particles to set into an integral mass as they are.

3. A method according to claim 1, further comprising the step of smoothing a top surface of the dry particle course, after the charging step.

4. A method of producing a patterned shaped article, comprising the steps of:

forming a dry particle course on a base surface;

forming a cavity in a portion of the dry particle course on which a pattern is to be expressed, by moving a scraper located at a prescribed position above the base surface in accordance with the pattern while at the same time removing particles by suction from said portion;

charging the cavity; and allowing the particles to set into an integral mass as they are.

5. A method according to claim 4, further comprising the step of overlaying the particles with a backing course before the step of allowing the particles to set into an integral mass as they are.

6. A method according to claim 4, wherein the scraper is provided with a suction port.

7. A method according to claim 4, further comprising the step of smoothing a top surface of the dry particle course, after the charging step.

* * * * *